United States Patent
Shen et al.

(10) Patent No.: US 12,363,368 B2
(45) Date of Patent: *Jul. 15, 2025

(54) EVENT-BASED CONTENT DISTRIBUTION

(71) Applicant: Google LLC, Mountain View, CA (US)

(72) Inventors: Fong Shen, Los Altos, CA (US); Tao Huang, Cupertino, CA (US); Jian Chen, Mountain View, CA (US); Yingwei Cui, Los Altos, CA (US); Xiaodan Song, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/974,204

(22) Filed: Oct. 26, 2022

(65) Prior Publication Data

US 2023/0052230 A1 Feb. 16, 2023

Related U.S. Application Data

(63) Continuation of application No. 17/071,217, filed on Oct. 15, 2020, now Pat. No. 11,503,355, which is a
(Continued)

(51) Int. Cl.
*H04N 7/16* (2011.01)
*H04N 21/24* (2011.01)
(Continued)

(52) U.S. Cl.
CPC ......... *H04N 21/2668* (2013.01); *H04N 21/24* (2013.01); *H04N 21/25841* (2013.01);
(Continued)

(58) Field of Classification Search
CPC ............... H04N 21/2668; H04N 21/24; H04N 21/25841; H04N 21/25891;
(Continued)

(56) References Cited

U.S. PATENT DOCUMENTS 6,141,060 A 10/2000 Honey et al.
7,305,691 B2 12/2007 Cristofalo
(Continued)

FOREIGN PATENT DOCUMENTS

CN 101578603 11/2009
CN 103714112 4/2014
(Continued)

OTHER PUBLICATIONS

Extended European Search Report in European Appln. No. 22215723.2, dated Feb. 22, 2023, 12 pages.
(Continued)

*Primary Examiner* — Annan Q Shang
(74) *Attorney, Agent, or Firm* — Fish & Richardson P.C.

(57) ABSTRACT

Methods, systems, and apparatus, including computer programs encoded on a computer storage medium, for distributing content are disclosed. In one aspect, a method includes storing, in a data structure, data specifying a future live event. An opportunity to provide the specified content to a user at a user device is identified. It is determined that (i) a time of the opportunity is between a start time and an end time for the live event, (ii) that a user device is located in a same geographic region as the live event based on geographical data provided by the user device, and (iii) the user is interested in the live event based on attributes of the user matching attributes of other users that were identified as interested in the live event (e.g., based on evaluation of online search data). The content is provided for display at the user device.

19 Claims, 5 Drawing Sheets

Related U.S. Application Data continuation of application No. 15/810,943, filed on Nov. 13, 2017, now Pat. No. 10,848,813, which is a continuation of application No. 14/854,463, filed on Sep. 15, 2015, now Pat. No. 9,832,504.

(51) Int. Cl.
| | | |
|---|---|---|
| *H04N 21/258* | (2011.01) | |
| *H04N 21/262* | (2011.01) | |
| *H04N 21/2668* | (2011.01) | |
| *H04N 21/482* | (2011.01) | |
| *H04N 21/81* | (2011.01) | |

(52) U.S. Cl.
CPC . *H04N 21/25891* (2013.01); *H04N 21/26241* (2013.01); *H04N 21/4828* (2013.01); *H04N 21/812* (2013.01)

(58) Field of Classification Search
CPC ......... H04N 21/26241; H04N 21/4828; H04N 21/812; G06F 16/953
See application file for complete search history.

(56) References Cited

U.S. PATENT DOCUMENTS

| | | | |
|---|---|---|---|
| 7,774,335 B1 | 8/2010 | Scofield et al. | |
| 8,560,629 B1 | 10/2013 | Bhatti et al. | |
| 8,621,545 B2* | 12/2013 | Bugenhagen | G06F 21/10 725/98 |
| 8,806,530 B1 | 8/2014 | Izdepski et al. | |
| 8,849,184 B1 | 9/2014 | Cannon | |
| 8,903,940 B2 | 12/2014 | Martin et al. | |
| 9,374,630 B1* | 6/2016 | Nijim | H04N 21/2668 |
| 10,469,916 B1 | 11/2019 | Teller | |
| 2003/0018521 A1 | 1/2003 | Kraft | |
| 2003/0208754 A1 | 11/2003 | Sridhar et al. | |
| 2003/0221191 A1 | 11/2003 | Khusheim | |
| 2004/0006768 A1 | 1/2004 | Deshpande et al. | |
| 2006/0173701 A1 | 8/2006 | Gurvey | |
| 2006/0195866 A1* | 8/2006 | Thukral | H04N 21/44016 725/35 |
| 2007/0159522 A1 | 7/2007 | Neven | |
| 2008/0066098 A1 | 3/2008 | Witteman et al. | |
| 2008/0109376 A1 | 5/2008 | Walsh et al. | |
| 2008/0154877 A1 | 6/2008 | Joshi | |
| 2008/0182343 A1 | 7/2008 | Deshpande et al. | |
| 2009/0089352 A1 | 4/2009 | Davis et al. | |
| 2009/0100465 A1 | 4/2009 | Kulakowski | |
| 2009/0106645 A1 | 4/2009 | Knobel | |
| 2009/0125380 A1 | 5/2009 | Otto | |
| 2009/0249244 A1 | 10/2009 | Robinson | |
| 2009/0287687 A1 | 11/2009 | Martire et al. | |
| 2010/0064307 A1 | 3/2010 | Malhotra | |
| 2010/0122285 A1* | 5/2010 | Begeja | H04N 21/439 725/34 |
| 2010/0184405 A1 | 7/2010 | Chen | |
| 2010/0205049 A1 | 8/2010 | Long | |
| 2010/0324992 A1* | 12/2010 | Birch | H04N 21/4722 725/32 |
| 2011/0016479 A1 | 1/2011 | Tidwell | |
| 2011/0060808 A1 | 3/2011 | Martin et al. | |
| 2011/0099069 A1 | 4/2011 | Hoelz | |
| 2011/0153782 A1 | 6/2011 | Zhao | |
| 2011/0202966 A1 | 8/2011 | Gupta | |
| 2011/0238647 A1 | 9/2011 | Ingram | |
| 2011/0295677 A1 | 12/2011 | Dhingra | |
| 2011/0321087 A1 | 12/2011 | Huber et al. | |
| 2012/0005023 A1 | 1/2012 | Graff | |
| 2012/0060195 A1 | 3/2012 | Fishman | |
| 2012/0131609 A1* | 5/2012 | Fernandez Gutierrez | H04N 21/23424 709/204 |
| 2012/0149396 A1 | 6/2012 | Fan et al. | |
| 2012/0198497 A1 | 8/2012 | Chan | |
| 2013/0046856 A1 | 2/2013 | Joong | |
| 2013/0144716 A1* | 6/2013 | Xiong | H04N 21/25808 705/14.52 |
| 2013/0262494 A1 | 10/2013 | Petersen et al. | |
| 2013/0305281 A1* | 11/2013 | Cansler | H04N 21/2407 725/34 |
| 2014/0089320 A1 | 3/2014 | Baldwin et al. | |
| 2014/0136528 A1 | 5/2014 | Anima et al. | |
| 2014/0172542 A1 | 6/2014 | Poncz et al. | |
| 2014/0173640 A1 | 6/2014 | Walsh | |
| 2014/0181294 A1 | 6/2014 | Deshpande | |
| 2014/0310062 A1 | 10/2014 | Klein | |
| 2015/0112963 A1 | 4/2015 | Mojtahedi | |
| 2015/0120407 A1 | 4/2015 | Deshpande et al. | |
| 2015/0242892 A1 | 8/2015 | Priebatsch | |
| 2015/0264416 A1* | 9/2015 | Heinz, II | H04N 21/23412 725/34 |
| 2015/0288997 A1* | 10/2015 | Basra | H04N 21/44209 725/9 |
| 2015/0334061 A1 | 11/2015 | Baird | |
| 2015/0373231 A1 | 12/2015 | Biswas et al. | |
| 2015/0373391 A1 | 12/2015 | Naik Atul | |
| 2016/0094860 A1* | 3/2016 | Minezawa | H04N 19/159 375/240.12 |
| 2016/0094866 A1 | 3/2016 | Frazzini | |
| 2016/0127776 A1 | 5/2016 | Zilberstein | |
| 2016/0156988 A1 | 6/2016 | Tam | |
| 2016/0253710 A1 | 9/2016 | Publicover et al. | |
| 2017/0230454 A1 | 8/2017 | Ferrer | |
| 2017/0243244 A1* | 8/2017 | Trabelsi | G06Q 30/0255 |
| 2017/0249610 A1 | 8/2017 | Ferrer | |
| 2019/0289350 A1* | 9/2019 | Gates | H04M 15/57 |
| 2020/0120398 A1* | 4/2020 | Teller | H04N 21/4668 |
| 2022/0036405 A1* | 2/2022 | Publicover | H04W 4/21 |

FOREIGN PATENT DOCUMENTS

| | | |
|---|---|---|
| CN | 103988219 | 8/2014 |
| CN | 104620522 | 5/2015 |
| CN | 104871193 | 8/2015 |
| JP | 2002-41537 | 2/2002 |
| JP | 2005-285128 | 10/2005 |
| JP | 2008-262301 | 10/2008 |
| JP | 2013-37404 | 2/2013 |
| JP | 2013-530447 | 7/2013 |
| JP | 2014-006842 | 1/2014 |
| JP | 2014-146378 | 8/2014 |
| WO | WO 2014/002358 | 1/2014 |

OTHER PUBLICATIONS

Extended European Search Report in European Appln. No. 16847004.5, dated Sep. 3, 2018, 8 pages.
International Preliminary Report on Patentability issued in International Application No. PCT/US2016/043987, mailed on Mar. 29, 2018, 8 pages.
International Search Report and Written Opinion in International Appln. No. PCT/US2016/043987, mailed on Oct. 11, 2016, 10 pages.
Office Action in Chinese Appln. No. 201680004449.2, dated Jan. 20, 2020, 18 pages (with English translation).
Office Action in Chinese Appln. No. 201680004449.2, dated Jun. 2, 2020, 9 pages (with English translation).
Office Action in European Appln. No. 16847004.5, dated Feb. 4, 2020, 6 pages.
Office Action in European Appln. No. 16847004.5, dated May 28, 2021, 5 pages.
Office Action in Japanese Appln. No. 2017-545966, dated Sep. 10, 2018, 9 pages (with English translation).
Office Action in Korean Appln. No. 10-2017-7024583, dated Aug. 21, 2018, 12 pages (with English translation).
Office Action in Chinese Appln. No. 202110019875.6, mailed on Mar. 6, 2024, 22 pages (with English translation).
Office Action in European Appln. No. 22215723.2, mailed on Apr. 9, 2024, 6 pages.

(56) References Cited

OTHER PUBLICATIONS

Notice of Allowance in Chinese Appln. No. 202110019875.6, mailed on Sep. 4, 2024, 7 pages (with English translation).
Office Action in German Appln. No. 112016004178.0, mailed on Dec. 20, 2024, 19 pages (with English translation).

* cited by examiner

EVENT-BASED CONTENT DISTRIBUTION

CROSS-REFERENCE TO RELATED APPLICATION

This application is a continuation of U.S. application Ser. No. 17/071,217, filed Oct. 15, 2020, now U.S. Pat. No. 11,503,355, which issued Nov. 15, 2022, which application is a continuation of U.S. application Ser. No. 15/810,943, filed Nov. 13, 2017, now U.S. Pat. No. 10,848,813, which issued Nov. 24, 2020, which is a continuation of U.S. application Ser. No. 14/854,463, filed Sep. 15, 2015, now U.S. Pat. No. 9,832,504, which issued Nov. 28, 2017, the contents of each are incorporated by reference herein.

BACKGROUND

This specification relates to data processing and content distribution.

The Internet facilitates the exchange of information and transactions between users across the globe. This exchange of information enables content sponsors to provide sponsored content to a variety of users. A content sponsor can control the distribution of their content items (e.g., promotions, advertisements, audio files, video files, or other content items) based on a set of distribution parameters that specify under what conditions a content item is eligible to be distributed. When a presentation opportunity meeting the conditions is available, the content item provided by a content sponsor is deemed eligible to be provided for presentation.

SUMMARY

In general, one innovative aspect of the subject matter described in this specification can be embodied in methods that include the actions of receiving, from a content provider and by one or more data processing apparatus, event distribution data specifying content to be distributed during a live event that will occur in the future; identifying, by the one or more data processing apparatus and after receiving the event data, an opportunity to provide the content to a user at a user device based on data submitted to the one or more data processing apparatus by the user device; determining, by the one or more data processing apparatus, that a time of the opportunity is between a start time and an end time for the live event; determining, by the one or more data processing apparatus, that the user device is located in a same geographic region as the live event based on geographical data provided by the user device and that the user is interested in the live event based, at least in part, on attributes of the user matching attributes of users that were identified as interested in the live event, and providing, by the one or more data processing apparatus and to the user device, computer executable instructions that initiate presentation of the content on a display of the user device in response to determining that the time of the opportunity is between the start time and the end time, the user device is located in the same geographic region, and the user interested in the live event. Other embodiments of this aspect include corresponding systems, apparatus, and computer programs, configured to perform the actions of the methods, encoded on computer storage devices.

These and other embodiments can each optionally include one or more of the following features. Methods can include the action of providing data that present, at a device of the content provider, a user interface specifying a list of live events. Receiving event data can include receiving, through the user interface, a selection of one or more of the live events.

Methods can include the action of determining an interest period for the live event based on changes in query volume for search queries referencing the live event. The interest period can include an interest start time, a peak interest time, and an interest end time.

Determining the interest period can include determining the interest start time of the live event when search query volume for queries related to the live event increases by a specified amount; determining the peak interest time comprises determining when, during the interest period, the search query volume for the queries related to the live event will reach a highest level; determining the interest end time comprises determining when the search query volume for the queries related to the live event will decrease by a specified amount from the highest level.

Determining that a time of the opportunity is between the start time and the end time of the live event can include determining that the time of the opportunity is between the interest start time and the interest end time.

Methods can include the actions of identifying a future event having characteristics matching distribution criteria associated with content provided by the content provider; and providing, based on the identification, computer executable instructions that initiate presentation of the future event as a live event for the content provider to select as the live event to use for purposes of distributing content provided by the content provider.

Methods can include the actions of identifying a set of distribution criteria that will cause the content to be distributed to users interested in the live event, the set of distribution criteria including a time period for the event and a geographic region in which the live event occurs; and in response to receiving the event data, associating, within a computer memory, the set of distribution criteria with the content. Determining that the time of the opportunity is between the start time and the end time for the live event can include determining that the time of the opportunity is within the time period for the event; and determining that the user is in the same geographic region comprises determining that a match exists between the geographical data and the geographic region in which the live event occurs.

Particular embodiments of the subject matter described in this specification can be implemented so as to realize one or more of the following advantages. Using live events as the basis for content delivery enables a system to provide relevant information at times when the information is most relevant (e.g., during an interest period for the live event). When live events are used as the basis for content delivery, the progress of the live event can be monitored to stop delivery of the content when the live event has ended. The delivery of content can also be stopped when user interest in the live event falls by a specified amount, thereby preventing distribution of content to users after interest in the live event has waned. User interest over a duration of a future event can be determined, at least in part, based on historical search query data related to previous instances of a same or similar event, thereby enabling content delivery during periods when users will be interested in the future event. Using event-based content distribution reduces the amount of input required from a content sponsor, thereby simplifying and streamlining the selection of distribution parameters for content. For example, selection of a single event will cause multiple different distribution criteria to be associated with a given portion of content. As such, multiple distribution parameters can be associated with the given portion of content in the time it takes to select the single event, rather than requiring entry of multiple different criteria (e.g., which would generally take longer).

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document discusses event-based content distribution. In some implementations, the occurrence of a real-world event (e.g., concert, sports event, weather event, news event, or political event) can be the basis of distributing content related to that event. A content sponsor (or other content provider) is enabled to select (e.g., through a provided user interface) one or more events that are to be used as the basis for distributing content. The content sponsor need not specify a full set of distribution criteria, as the devices and system discussed in this document will select the distribution criteria based on the selected event, and associate the selected distribution criteria with the content to be distributed.

In some implementations, the distribution criteria include user attributes and geographic information that cause the content to be distributed to users interested in the live event even when the users are accessing network resources that are unrelated to the event. For example, a user requesting a social media feed may not have requested a resource related to an upcoming concert, but when user attributes of the user match the distribution criteria selected for the concert and the request for the social media feed is received within an interest period for the concert, the content can be distributed to the user despite the fact that the user may not have directly expressed an interest in the concert.

The description that follows is applicable to the distribution of various types of content (e.g., audio files, video files, or other content) that are provided to user devices.

Figure 1:
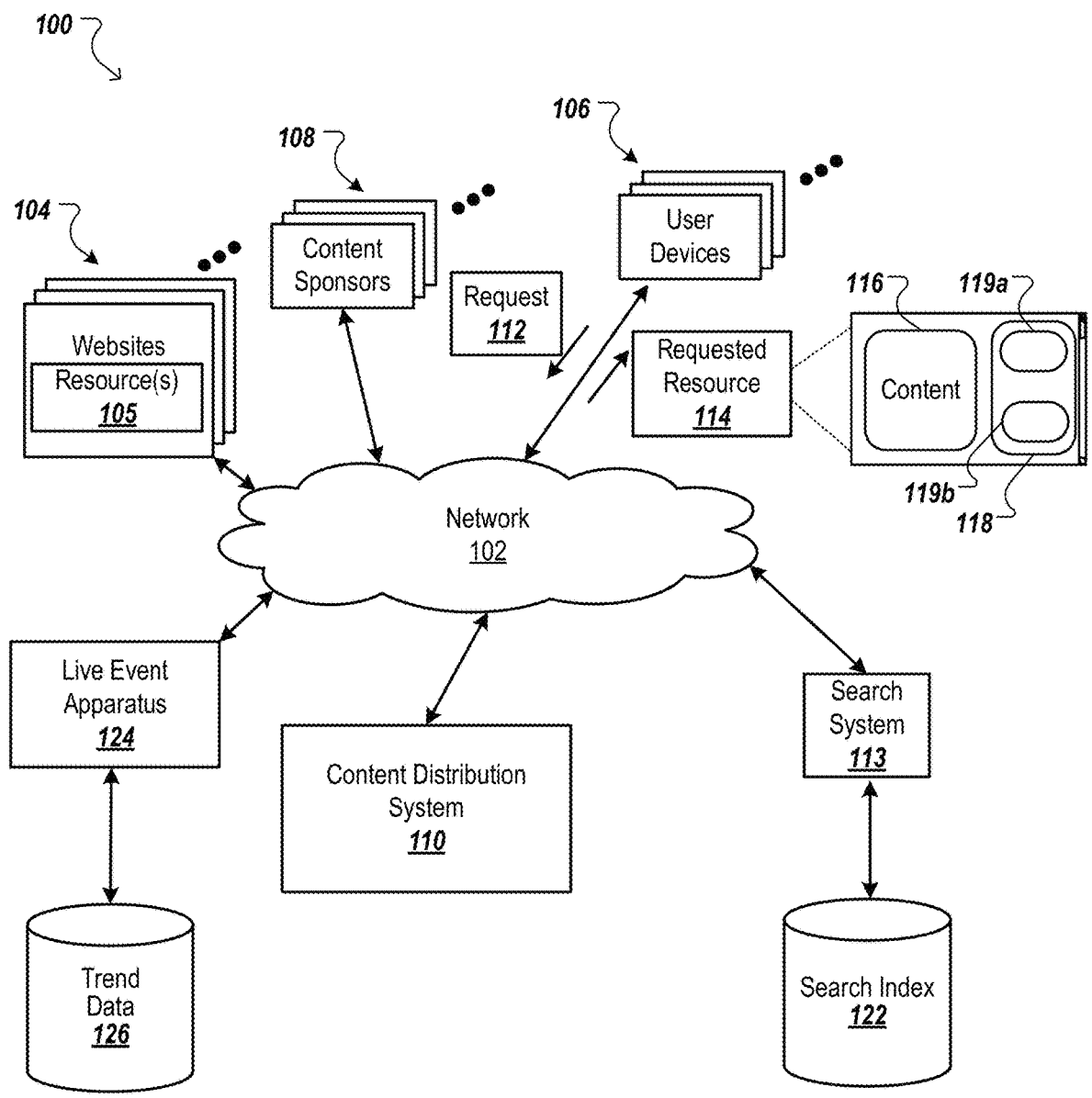
FIG. 1 is a block diagram of an example environment in which content distribution system distributes content to user devices.

FIG. 1 is a block diagram of an example environment 100 in which content is distributed to user devices 106. The example environment 100 includes a network 102, such as a local area network (LAN), a wide area network (WAN), the Internet, or a combination thereof. The network 102 connects websites 104, user devices 106, content sponsors 108, and a content distribution system 110. The example environment 100 may include many different websites 104, user devices 106, and content sponsors 108.

A website 104 is one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a publisher, which is an entity that controls, manages and/or owns the website 104.

A resource 105 is any data that can be provided over the network 102. A resource 105 is identified by a resource address that is associated with the resource 105. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts).

Units of content that are presented in (or with) resources are referred to as content items, and an individual content item can be stored in a single file or set of files independent of the resource. In some implementations, content items are inserted into the resource based on execution of a script embedded in the resource. For example, as discussed in more detail below, a script embedded in an electronic resource can cause a user device to initiate a request for the content item after retrieving the electronic resource. As such, the content items may not be considered part of the resource, but rather may be considered additional content (e.g., from a third party other than the provider of the resource) that is combined with the resource when the resource is rendered. The request can be formatted as packetized data that includes a header and payload data. The request can include data such as, a name (or network location) of a server from which the content item is being requested, a name (or network location) of the requesting device, and/or information that the server can use to select a content item to provide in response to the request. The request is transmitted, by the user device, over the network (e.g., a telecommunications network) to a server of the content distribution system, as described in more detail below.

A user device 106 is an electronic device that is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can submit a resource request 112 that requests a resource 105 from a website 104. In turn, data representing the requested resource 114 can be provided to the user device 106 for presentation by the user device 106. The requested resource 114 can be, for example, a home page of a website 104, a web page from a social network, or another resource 105. The data representing the requested resource 114 can include data that cause presentation of resource content 116 at the user device 106. The data representing the requested resource 114 can also include data specifying a content item slot 118.

A content item slot is a portion of the resource (e.g., a portion of a web page) or a portion of a user display (e.g., a presentation location of another window or in a slot of a web page) in which one or more content items, such as advertisements, can be presented. A content items slot 118 can also be referred to as an advertisement slot, but any type of content (e.g., content items other than advertisements) can be presented in the content item slot 118.

A single content item slot 118 may be configured to include one or more presentation positions 119a and 119b. Alternatively, or additionally, each different content item slot 118 can be considered a separate presentation position, and a resource can include multiple different content item slots. Each presentation position can represent a portion of the content item slot 118 at which a content item can be presented. In some implementations, the number of presentation positions and/or the size of the presentation positions for a particular content item slot 118 may be determined based on the number, type, and/or value of content items that are available for presentation in the content item slot.

To facilitate searching of resources, the environment 100 can include a search system 113 that identifies the resources by crawling and indexing the resources provided by the publishers on the websites 104. Data about the resources can be indexed based on the resource with which the data are associated. The indexed and, optionally, cached copies of the resources are stored in a search index 122. Data that are associated with a resource is data that represents content included in the resource and/or metadata for the resource.

User devices 106 can submit search queries to the search system 113 over the network 102. In response, the search system 113 accesses the search index 122 to identify resources that are relevant to the search query. The search system 113 identifies the resources in the form of search results and returns the search results to the user device in search results page. A search result is data generated by the search system 113 that identifies a resource that is responsive to a particular search query, and includes a link to the resource. An example search result can include a web page title, a snippet of text or a portion of an image extracted from the web page, and the URL of the web page. Like other resources, search results pages can include one or more content item slots 118 in which content items, such as advertisements, can be presented.

When a resource 105 is requested by a user device 106, execution of code associated with a content item slot 118 in the resource initiates a request for one or more content items to populate the slot, which is referred to as a content item request. The content item request can include data specifying the resource and characteristics of the slots that are defined for the requested resource 114. For example, data specifying a reference (e.g., URL) to the requested resource 114 for which the content item slot 118 is defined, a size of the content item slot, a maximum number of presentation positions (or content items) that can be included in the content item slot 118, and/or media types that are eligible for presentation in the content item slot 118 can be provided to the content distribution system 110. Similarly, data specifying keywords associated with a requested resource ("resource keywords") or entities that are referenced by the resource can also be included in the content item request and provided to the content distribution system 110 to facilitate identification of content items that are relevant to the requested resource 114. Content item requests can also include data related to other information, such as information that the user has provided, geographic information indicating a state or region from which the request was submitted, or other information that provides context for the environment in which the content item will be displayed (e.g., a type of device at which the content item will be displayed, such as a mobile device or tablet device). The content item requests can be transmitted, for example, over a packetized network, and the content item requests themselves can be formatted as packetized data having a header and payload data. The header can specify a destination of the packet and the payload data can include any of the information discussed above.

The content items that are provided in response to a content item request (or another request) are identified based, in part, on distribution parameters associated with the content items (e.g., represented by distribution data). Distribution parameters are a set of criteria upon which distribution of content items are conditioned. In some implementations, the distribution parameters for a particular content item can include distribution keywords that must be matched (e.g., by resource keywords or search queries) in order for the content item to be eligible for presentation. The distribution parameters can also require that the content item request include information specifying a particular geographic region (e.g., country or state) and/or information specifying that the content item request originated at a particular type of user device. The distribution parameters can also specify a bid and/or budget for distributing the particular content item. As described in more detail below, bids can be used to select a set of content items for presentation with a resource and/or to determine in which presentation position the content item(s) will be presented.

The content items are selected for presentation in the presentation position based on the outcome of a content item selection process. In some implementations, the content item selection process can include an auction. The auction can be performed based, at least in part, based on bids that are associated with the content items. For example, assume that a first content item is associated with a cost per click (CPC) bid of $1.25 and a second content item is associated with a CPC bid of $1.00. In this example, the first content item may be selected for presentation in the presentation position 119a (e.g., a highest presentation position) and the second content item can be selected for presentation in presentation position 119b because the bid for content item 1 is higher than the bid for content item 2.

In the example above, the content items were selected based solely on the values of their respective CPC bids. However, content items can be selected based on auction scores that are determined based on additional (or other) information. For example, an auction score for a particular content item can be a product of a CPC bid of the content item and a probability that a user will click on the content item to request a landing page to which the content item links (e.g., CPC bid*p_click, where p_click is the probability that a user will click the content item when presented). Note that for purposes of example, this document refers to bid generally, and that a bid can be specified as a CPC bid or a CPM ("cost-per-mille") bid, and CPC bids can be converted to an eCPM (estimated CPM) value so that the bids can be directly compared.

The eCPM bid can be determined, for example, based on a product of an interaction rate (e.g., click rate) for a content item and the CPC bid for the content item. If the content item offers two or more different actions that a user can invoke through interaction with the content item, the eCPM for that content item can be determined based on a sum of the products of the interaction rate for the action and the bid (e.g., $\Sigma_1^x \text{InteractionRate}_x * \text{bid}$, where $\text{InteractionRate}_x$ is the interaction rate for Action_x and bid is the bid specified for the content item).

The probability that a particular content item will receive a click (or another interaction) can be based on a historical click through rate (or interaction rate) of the content item. For example, assume that a particular content item has a historical click rate of 0.10, indicating that the particular content item receives one click for every ten presentations of the content item. In this example, the probability that the content item will receive a click can be set to 0.10. Thus, the value 0.10 can be multiplied by the CPC bid for the particular content item to obtain the auction score for the particular content item. In turn, the content items having the highest N auction scores can be selected for presentation in N available presentation positions, where N is an integer number of available presentation positions.

As discussed above, various different distribution criteria can be specified to control distribution of content items to user devices 106. Generally, these distribution criteria are each separately specified by the content sponsor that sponsors the content item. For example, a content sponsor that sponsors a given content item may select a given professional sports team name as a distribution keyword used to distribute the given content item in an effort to reach users interested in the given professional sports team. Similarly, the content sponsor can separately configure times during which the given content item is to be distributed and/or geographic regions in which the given content item is to be distributed. In some implementations, the content sponsor provides these distribution criteria to the content distribution system 110, which then controls distribution of the given content item in response to requests that include information matching the distribution criteria.

It can sometimes be difficult to reach an intended audience by specifying distribution criteria as described above. For example, assume that a content sponsor wants a content item distributed to users that are interested in an upcoming live event. In this example, it can be difficult for the content sponsor to identify a combination of distribution keywords and/or time periods that can be used to reach users while they are interested in the upcoming live event. For example, user interest in the upcoming live event may be can at some point prior to the beginning of the live event, may peak at some point during the live event, and may end at some point after the live event. Additionally, the resources that are requested by some users interested in the live event may not be related to the live event. For example, a group of users that would be interested in a given concert may not actually visit a resource related to the concert or submit, to the search engine, an online search query related to the concert. In this example, it can be difficult for the content sponsor to identify a distribution keyword that would cause a content item to reach this group of users.

The environment 100 includes a live event apparatus 124 that enables a content sponsor to distribute content items to users interested in a live event. As discussed in more detail below, the live event apparatus 124 can determine a period of time during which users will be interested in a given live event, and determine various distribution keywords that will cause a content item to be distributed to users interested in the given live event. For example, the live event apparatus 124 can evaluate search query trend data 126 to determine when user interest in the given live event has begun, when the user interest is peaking, and/or when user interest in the given live event has ended. Additionally, the live event apparatus 124 can identify attributes of users that are interested in the given live event and/or keywords related to the live event. The live event apparatus 124 can enable the content sponsor to simply specify the given live event (e.g., by picking the live event from a set of upcoming live events presented in a user interface), and in turn, the live event apparatus 124 will distribute one or more content items for the content sponsor to users interested in the given live event (e.g., based on the distribution criteria that the live event apparatus ("LEA") 124 determined will cause the content item to reach users interested in the live event).

Figure 2:
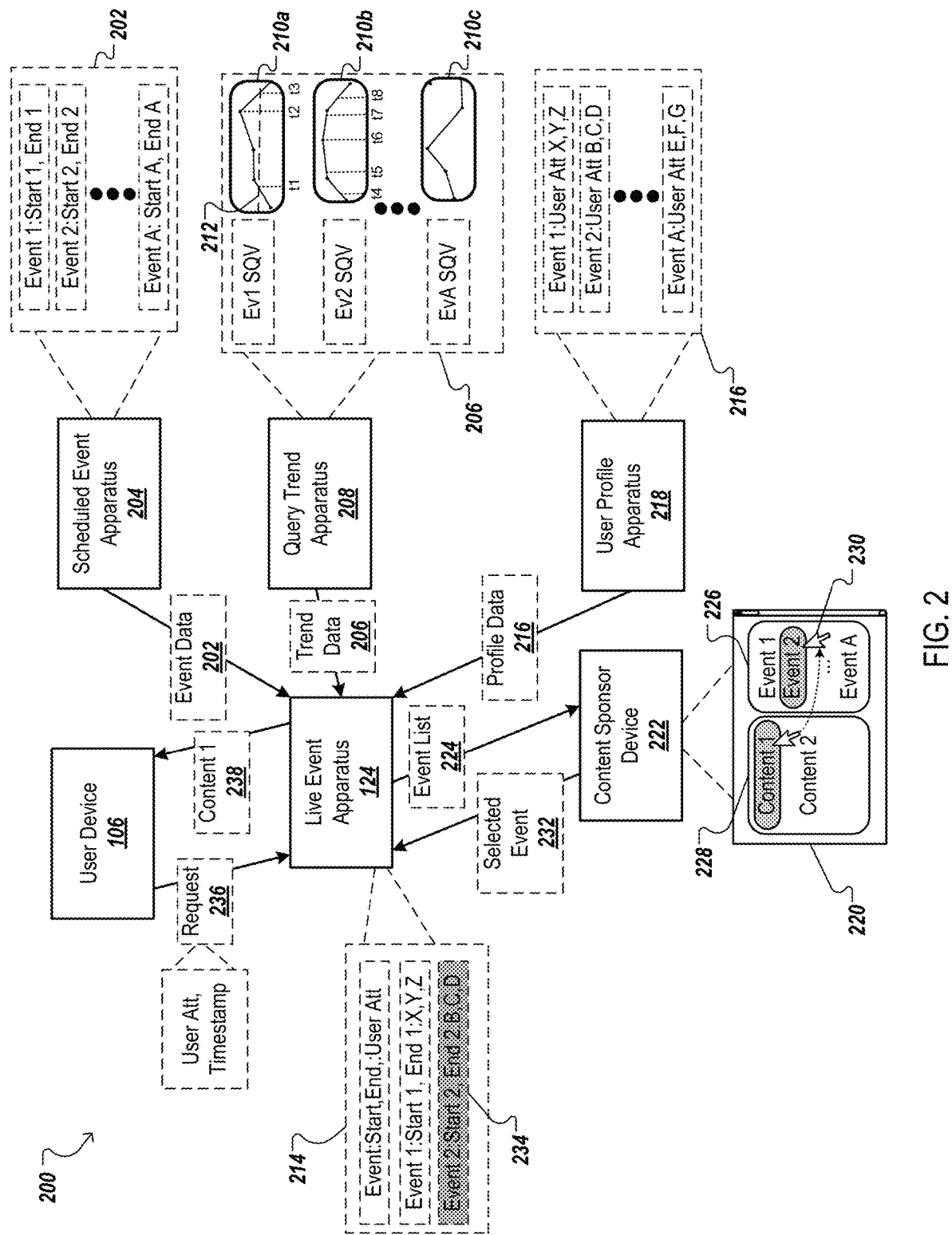
FIG. 2 is an example data flow for distributing content to users interested in live events.

FIG. 2 is an example data flow 200 for distributing content to users interested in live events. The data flow begins with the LEA 124 obtaining event data 202 from a scheduled event apparatus 204 (e.g., a server that provides information regarding scheduled events). The events that are represented in the event data 202 can be identified from various sources. For example, sporting event schedules can be obtained from websites of various sporting teams or sporting leagues, concert schedules can be obtained from concert promoter websites, and political event schedules (e.g., a schedule of debates) can be obtained from various politically related websites. In some implementations, a television (or other media) program guide can be used to identify upcoming live events. For example, analysis of a structure of a program guide listing may reveal that a given event (e.g., a tennis match) will be airing live at a given time in the future, and that it is scheduled to last for a given period of time.

The event data 202 specifies upcoming live events that have been scheduled (e.g., event 1, event 2, . . . , event A). The event data 202 can also specify a start time and/or an end time for each event (e.g., start 1-start A and end 1-end A). For example, if the upcoming live event is a sporting event, the start time may be the beginning of the sporting event or a time prior to the beginning of the sporting event when media coverage (e.g., a television broadcast) of the sporting event begins or when gates to the sporting event open. In this example, the end time may be an actual or estimated time at which the sporting event will end. For example, if an average duration of the sporting event is 4 hours, then the end time may be set to 4 hours after the start time.

In some implementations, the start time and/or the end time may not be specified. Instead, the data referencing the start time and/or end time may specify a location (e.g., a network address of a server) from which a current state of the live event can be obtained. For example, with reference to the sporting event above, the data referencing the start time and/or stop time may specify a location at which the current state of the sporting event (e.g., a period and/or time remaining on a game clock) can be obtained upon request. In this example, the LEA 124 can update the start and end times by submitting a request to the specified location. In particular, the LEA 124 can periodically get updated event information specifying the progress of the event, and then change the event criteria based on that event information.

In some implementations, the start and end time can be determined based on when user interest in the event begins or ends rather than an actual start or end time of the live event. For example, the LEA 124 can determine an interest period for a live event based, at least in part, on query volume and/or changes in query volume for search queries referencing the live event. To determine the interest period, the LEA 124 can obtain (or otherwise access) trend data 206 from a query trend apparatus 208 (e.g., a server or system that tracks search query volume). The trend data 206 can specify the query volume for a given search query over time, and may be based on historical search query information related to previous instances of the live event or search query information related to other live events that are similar to an upcoming live event. As such, the LEA 124 can request that the query trend apparatus 208 provide measures of the search query volume for one or more search queries that are related to a given live event. For example, as illustrated by FIG. 2, the LEA 124 can request search query volume information for queries related to each of Event 1-Event A (e.g., Ev1 SQV–EvA SQV), and receive various measures of search query volume for those queries over time.

For purposes of example, assume that the graph 210*a* represents the search query volume over time for queries related to Event 1, while the graph 210*b* and 210*c* respectively represent the search query volume over time for queries related to Event 2 and Event A. In this example, assume that a threshold search query volume (e.g., relative to a baseline search query volume), represented by the line 212 has been specified to determine the interest period for Event 1. When the search query volume rises above the threshold (e.g., at t1), interest in Event 1 is considered to have begun, and when the search query volume falls below the threshold (e.g., at t3), interest in Event 1 is considered to have ended. Thus, in this example, the LEA 124 can determine that the interest period for Event 1 is between t1 and t3 (e.g., representing a period between time 1 and time 3), such that the start time for Event 1 can be set to t1 and the end time for Event 1 can be set to t3. The times t1 and t3 can be expressed, for example, as specific dates and/or times, or as relative measures of time surrounding the live event (e.g., 3 days before the live event and 1 day after the live event).

In some implementations, interest period for a given event can be based on a determination that the search query volume has changes at least a specified amount over a specified period of time. For example, with reference to the graph 210*b* for Event 2, assume that the change in query volume between t4 and t5 meets a specified minimum query volume change related to a beginning of interest in Event 2. In this example, the LEA 124 can determine that interest in Event 2 has begins at t5 (or t4) based on the query volume change meeting the specified minimum query volume change. As such the LEA 124 can set the start time for Event 2 to t5. Similarly, assume that the change in query volume between t7 and t8 meets a specified minimum query volume change related to an end of interest in Event 2. In this example, the LEA 124 can set the end time for Event 2 to t8 (or t7), such that the interest period for Event 2 can be between t5 and t8.

The LEA 124 can also use the trend data 206 to identify a time at which interest in the live event peaks. For example, as illustrated by the graph 210*a*, the search query volume for queries related to Event 1 are highest at the time t2, such that t2 can be considered the time at which interest in Event 1 peaks. Similarly, as illustrated by the graph 210*b*, the search query volume for queries related to Event 2 are highest at the time t6, such that t6 can be considered the time at which interest in Event 2 peaks. In some implementations, the LEA 124 can define, as the peak interest time, a period surrounding the time at which the search query volume peaks. For example, the peak interest time may be 1 hour, 1 day, or 1 week surrounding the search query volume peak of a given event (e.g., potentially depending on a duration of the interest period for the event).

The LEA 124 can store the start time and end time for each event in association with the event (e.g., indexed according to the event and/or in a data structure that is created to store the start time and/or end time) in a set of event criteria 214. The event criteria 214 for a given event are a set of distribution criteria corresponding to the given event. For example, the event criteria can specify, for a given event, an event start time, an event end time, and user attributes of users that have been deemed interested in the given event. When information in a content item request matches the event criteria for a given event, content items being distributed based on the given event become eligible for distribution, as discussed in more detail below.

In some implementations, the user attributes of users that have been deemed interested in a given event can be determined based on profile data 216 that the LEA 124 can obtain (or otherwise access) from a user profile apparatus 218 (e.g., a server or other data processing apparatus that provides access to user profile information). The user profile apparatus 218 can provide profile data 218 that specifies user attributes of users that have been identified as interested in a given event. The user attributes can include, for example, other interests of the users (e.g., interests in events or topics other than the given event), demographic information related to an audience that expresses interest in the event, a geographic region in which users interested in the given event are located, and/or other information about the users interested in the given event. For example, as illustrated by the profile data 216, users that have been deemed interested in Event 1 have the user attributes X (e.g., Geographic Region X), Y (e.g., Interested in topic Y), and Z (e.g., in user group Z), while users that have been deemed interested in Event 2 have the user attributes of B (e.g., Geographic Region B), C (e.g., Interested in topic C), and D (e.g., in user group D).

The LEA 124 can store the profile data 216 in association with the corresponding events (e.g., indexed according to the corresponding events), for example, in the set of event criteria 214. Once the LEA 124 has compiled the event criteria, the LEA 124 can provide a content sponsor the ability to select one or more live events that will be used to distribute content for the content sponsor. For example, the LEA 124 can transmit data that initiate presentation of an event-based distribution interface 220 at a content sponsor device 222.

The data transmitted to the content sponsor device 222 can include event list data 224 that specifies events that can be used to distribute content for the content sponsor. For example, as illustrated in FIG. 2, the content sponsor device 222 can receive the event list data 224, and present a list of events 226 in a display of the content sponsor device 222. The event-based distribution interface 220 can also include a list of content 228 that is available for distribution using the list of events 226. For example, the list of content 228 can specify that content 1 and content 2 are available for distribution using the list of events 226. To distribute content based on an event, the content sponsor can select content from the list of content 228, and then specify which event will be used to distribute the selected content. For example, as illustrated by FIG. 2, the pointer 230 was used to select Content 1 from the list of content 228, and then used to select Event 2 from the list of events 226. Of course the association between the content and event can be made using other techniques (e.g., drop down boxes, text entry, etc.).

The content sponsor device 222 transmits selected event data 232 to the LEA 124 (or content distribution system 110), thereby indicating that content 1 should be distributed to users interested in event 2. The content sponsor can also specify other distribution criteria that can be used by the LEA 124 (and/or content distribution system 110) to distribute the content, as will be discussed in more detail below. In response to receiving the selected event data 232, the LEA 124 can associate the event criteria for the selected event with the content sponsor's content. For example, as illustrated by FIG. 2, the LEA 124 can associate content 1 with the event criteria 234 from the set of event criteria 214. As such, the content sponsor only needs to select a single event, and the LEA 124 will assign the corresponding event criteria (e.g., multiple different distribution criteria used to reach users interested in the event) to the specified content.

Once the LEA 124 has associated the event criteria corresponding to the selected event with the content, the content can be distributed to users that are deemed interested in the selected event. In some implementations, the users deemed to be interested in the selected event are users that have not directly expressed any interest in the selected event, but rather have the user attributes specified in the event criteria. For example, assume that a user device 106 submits a request for content 236 based on execution of code of an advertisement slot on a publisher page related to dogs. Further assume that the content sponsor requested that content 1 be distributed to users interested in Event 2, which is an upcoming concert. In this example, the publisher page being presented to the user is not directly related to the upcoming concert. However, the request 236 can include user attribute information and timestamp information that may be used to determine whether content 1 should be presented to the user with the publisher page related to dogs.

For example, the LEA 124 can compare a timestamp in the request (or a current time) to the interest period for Event 2 to determine whether the opportunity to provide content in response to the request is within the interest period for Event 2. When the LEA 124 determines that a timestamp in the request (or a current time) is within the interest period for Event 2 (e.g., between the start time (e.g., start 2) and the end time (e.g., end 2) for Event 2), the LEA 124 can further determine whether the user attributes associated with the request (e.g., included with the request or stored in profile information corresponding to a user identifier included in the request) match the user attributes of users deemed to be interested in Event 2. For example, the LEA 124 can determine whether geographic data (e.g., an Internet Protocol address, Global Positioning Satellite (GPS) data collected using a GPS component of the user device, or other geographic information) supplied by the user device matches a geographic region corresponding to Event 2, as well as whether the user's interests and/or demographic information matches user interests and/or demographic information specified in the event criteria for Event 2.

When the LEA 124 determines that the event criteria is matched by information in the request, the LEA 124 can make Content 1 eligible for distribution in response to the request 236. In turn, the LEA 124 can respond to the request 236 by transmitting, to the user device 106, computer executable instructions 238 that initiate presentation of Content 1 at the user device. For example, the LEA 124 can generate packetized data that includes a network address from which the user device 106 can retrieve Content 1. Upon receipt of the packetized data, the user device 106 will execute the instructions, which will cause the user device 106 to initiate a request for Content 1 from the network address included in the packetized data. Upon receipt of Content 1, the user device 106 renders and presents Content 1 with the publisher page.

When the LEA 124 identifies an opportunity to provide content at the user device 106 (e.g., either by receiving a request for content or determining that a given user is accessing content, such as a social network feed) that is not within the interest period for a given event, the content associated with event criteria corresponding to the given event will not be eligible for distribution in response to the opportunity. Similarly, if the opportunity is within the interest time period for the given event, but the user attributes specified in the event criteria for the given event are not matched, the content distributed based on the given event will not be eligible for distribution.

The description above refers to scheduled upcoming live events. However, the description above is also applicable to unscheduled live events. For example, weather events or other unscheduled/non-recurring events can be used for purposes of distributing content during interest periods for those events. The LEA 124 can communicate with various other apparatus, such as weather apparatus and a news apparatus which respectively provide information related to the weather and/or news events. For example, the LEA 124 can communicate with one or more servers that provide real time weather information in order to obtain the weather information for a variety of geographic locations. The LEA 124 can then use the weather information to identify live weather events. For example, if it is currently snowing in one geographic location, the LEA 124 can determine that the event "snowing" is a live event for that geographic location. Similarly, the LEA 124 can obtain breaking news information from various third party news servers, and use the news information to identify live news events. For example, assume that the President of the United States is making an unscheduled speech. In this example, the LEA 124 can identify the occurrence of the speech based on information obtained from the breaking news information, and identify the speech as a live event. The occurrence of the live events can then be used to distribute content.

Assume for purposes of example, that a content sponsor selects the event "snowing" from the list of events 226. In this example, the LEA 124 can use the information obtained from the various other apparatus to determine when and where snow is falling, and associate the appropriate event criteria with the content. Because of the nature of these events, the LEA 124 can dynamically and automatically (e.g., absent human intervention) change the event criteria that are required to be matched in order to distribute the content. For example, based on the information obtained, the LEA 124 may determine during a first hour that it is snowing in Austin, TX, but not in Atlanta, GA, and that in a second hour it is no longer snowing in Austin, TX, but is snowing in Atlanta, GA. During the first hour, the event criteria for the content will specify a geographic region corresponding to Austin, TX, while the event criteria will be changed to specify a geographic region corresponding to Atlanta, GA during the second hour. In this example, during the first hour, the content will be eligible for distribution to users in Austin, TX, but not eligible for distribution to users in Atlanta, GA. However, in the second hour, the content will be eligible for distribution to users in Atlanta, GA, but not eligible for distribution to users in Austin, TX.

Figure 3:
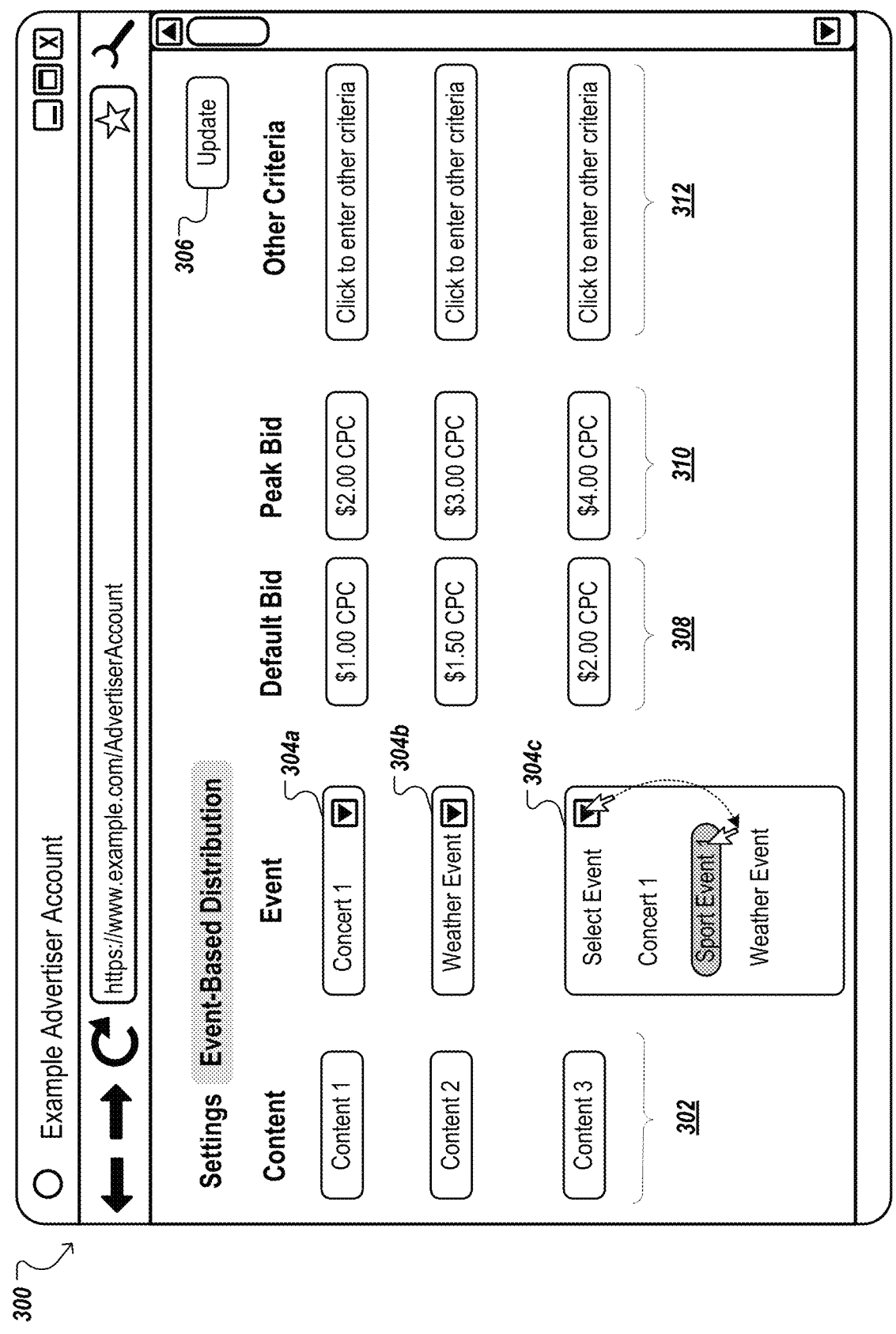
FIG. 3 is an illustration of an example user interface that can be used to select event-based content distribution.

FIG. 3 is an illustration of an example user interface 300 that can be used to select event-based content distribution. The user interface 300 includes a list of content 302 that is available for event-based distribution (e.g., Content 1-Content 3). The user interface 300 also includes a set of controls 304a-304c that can be used to select events to be used to distribute the content. For example, as illustrated, the control 304a was used to select Concert 1 as the event that will be used to distribute Content 1, while the control 304b was used to select Weather Event as the event used to distribute Content 2. With reference to the control 304c, FIG. 3 shows that content sponsor interaction with the control 304c causes a list of events to be presented in the user interface. For example, interaction with the control 304c reveals the events of Concert 1, Sport Event 1, and Weather Event as the events that can be used to distribute Content 3. Subsequent interaction with Sport Event 1 will cause Content 3 to be distributed based on Sport Event 1. Upon selection of the submission control 306 can cause the selected events to be sent to the LEA 124, which can then associate multiple different event criteria with the content based on the selection of a single event from the list.

The user interface 300 also includes a set of Default Bid entry elements 308. The Default Bid entry elements 308 enable a content sponsor to enter a default bid that will be used in a content selection process to identify the content that will be distributed in response to a given presentation opportunity. The default bid can be used any time during the interest period for the given event being used to distribute the content. For example, the bid of $1.00 can be used at any point during the interest period for Concert 1.

The user interface 300 further includes a set of Peak Bid entry elements 310. The Peak Bid entry elements 310 enable a content sponsor to enter a bid that will be used during a peak interest period for the event. For example, as discussed above, the trend data can be used to identify a peak interest in a given event, and a peak interest period can be specified based on the identified peak interest. During the peak interest period, the LEA 124 will automatically (e.g., without human intervention) use the peak bid, rather than the default bid, for purposes of selecting content in the content selection process. In the event that a peak bid is not specified for a given event, the default bid can be used during the peak interest period for the given event.

The user interface also includes a set of Other Criteria entry elements 312. The Other Criteria entry elements 312 enable a content sponsor to specify various other distribution criteria that can be used in conjunction with the selected event to distribute the content. For example, the content sponsor can specify geographic criteria, demographic criteria, time of day criteria, and/or other criteria that be used to further control the distribution of the content (e.g., in addition to the event criteria that will be assigned by the LEA 124 based on the selected event).

Figure 4:
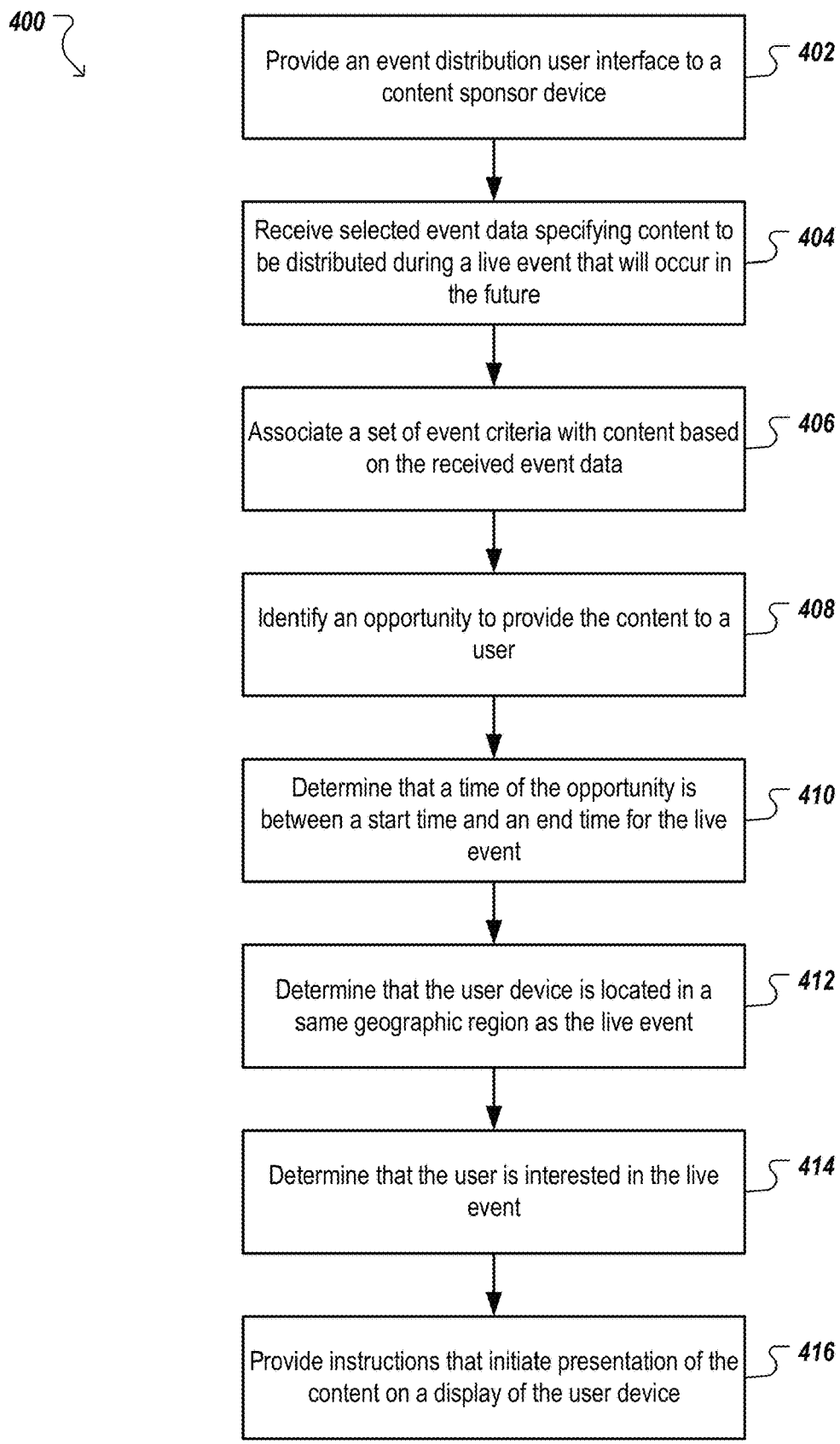
FIG. 4 is a flow chart of an example process for event-based content distribution.

FIG. 4 is a flow chart of an example process 400 for event-based content distribution. The process 400 can be performed, for example, by the LEA 124, the content distribution system 110, or another data processing apparatus. The process 400 can also be implemented as computer executable instructions stored on computer storage medium, and execution of the instructions by one or more data processing apparatus cause the one or more data processing apparatus to perform some or all of the operations of the process 400.

An event distribution user interface is provided to a content sponsor device (402). In some implementations, the event distribution user interface enables a content sponsor to select one or more events that will be used to distribute a given portion of content (e.g., a content item, such as an advertisement). For example, an event distribution user interface similar to the examiner user interface 300 discussed above can be provided to the content sponsor device. The user interface can present, at the device of the content sponsor, a list of upcoming live events (e.g., concerts, elections, movie premiers, awards shows, or sporting events to name a few) that can be used to distribute content for the content sponsor.

In some implementations, the events listed in the user interface can include events that are selected based on distribution criteria that the content sponsor has previously used to distribute content. For example, a data processing apparatus (e.g., the LEA 124) can identify distribution criteria (e.g., keywords and/or geographic distribution criteria) that the content sponsor has previously used to distribute content. Using the identified distribution criteria, the data processing apparatus can identify a future event that has one or more characteristics matching the identified distribution criteria (e.g., distribution criteria the content sponsor as associated with content). In turn, the data processing apparatus can provide, to the content sponsor device, computer executable instructions that initiate presentation of the identified future event as a live event for the content sponsor to select as the live event to use for purposes of distributing content provided by the content provider.

Selected event data are received (e.g., as event distribution data) (404). In some implementations, the selected event data specify content to be distributed during a live event that will occur in the future. As discussed above, a content sponsor can select an event from a list of events presented in a user interface specifying that content provided by the content sponsor is to be distributed to users interested in the selected event. For example, the selected event data can specify which of one or more live events were selected from the user interface that was presented at the content sponsor device. The selected event data can be stored, for example, in a data structure corresponding to a content sponsor that submitted the selected event data.

In response to receiving the selected event data, a set of event criteria are associated with given content provided by the content sponsor (406). The set of event criteria are a set of distribution criteria that will cause the given content to be distributed to users interested in the live event. In some implementations, the set of event criteria includes a time period for the event (e.g., an interest period and/or start/end time for the event) and a geographic region in which the event occurs.

As discussed above with reference to FIG. 2, the set of event criteria can be identified based on information obtained from various sources. For example, a list of upcoming events, as well as start/end times can be obtained from an event apparatus, an interest duration can be determined based on trend data obtained from a query trend analysis apparatus, and user attributes of users interested in the events can be determined based on profile information obtained from a user profile apparatus. The information corresponding to each event can be associated with that event and used as the event criteria for that event.

In some implementations, the event criteria includes a time period for each event. For example, the time period may specify when the event is scheduled to start and when the event is scheduled to end. The time period may also, or alternatively, specify an interest period for the event. The interest period is a period during which user interest in the event is considered to be active. As discussed above, the interest period for a given event can be determined based on search query volume (or changes in search query volume) of search queries related to (or referencing) the event. For example, the beginning of the interest period (e.g., the interest start time) can be specified based on an increase in search query volume prior to the beginning of the event (or at some other time during the event), while the end of the interest period (e.g., the interest end time) can be specified based on a decrease in search query volume after the end of the event (or at some time prior to the end of the event). In some implementations, the interest start time corresponds to a specified increase in search query volume for queries related to the event, and the interest end time corresponds to a specified decrease (e.g., relative to a highest search query volume) in search query volume for queries related to the event.

A peak interest time (or period) for the event can be identified based on the highest level (or at least a specified level) of search query volume that is (or will be) reached during the interest period. For example, based on historical search query volume data, it can be determined that user interest in a given concert will peak 1 day prior to the concert based on a peak number of search queries being historically received 1 day prior to other instances of the concert (or similar concerts).

An opportunity to provide content to a user at a user device is identified after receiving the event data (408). The opportunity can be identified, for example, based on data submitted to one or more data processing apparatus by the user device. In some implementations, the opportunity to provide content is identified based on receipt of a content item request initiated by code embedded in a network resource. In some implementations, the opportunity to provide content is identified based on a user request for other content (e.g., a social network feed) or based on a user logging into a service (e.g., a social network).

A determination is made that a time of the opportunity is between a start time and an end time for the live event (410). As discussed above, the start time and the end time for the live event can be specified in the event criteria that are associated with the content. The start time can either be based on the actual time at which the live event will start or based on an interest start time for the event. Similarly, the end time can either be based on the actual (or estimated) end time of the live event or based on an interest end time for the event. The determination can be made, for example, by comparing a time of the opportunity to the start time and end time for live event. The time of the opportunity can be determined, for example, based on a timestamp received with a content item request (or other data), a current time available to the one or more data processing apparatus (e.g., a server clock), or based on a future time at which the presentation opportunity will occur. In some implementations, the content will be delivered to the user when the time of the opportunity is between the interest start time and the interest end time for the live event. In some implementations, the content will be delivered to the user when the time of the opportunity is between an actual start time for the event and an actual end time for the event.

A determination is made that the user device is in a same geographic region as the live event (412). In some implementations, the determination is based on geographical data provided by the user device. For example, the user device can include a Global Positioning System, and use this system to provide data as to the location of the user device. Additionally, or alternatively, a generalized location of the user device can be determined based on an IP address of the user device. Once the geographic location of the user device has been determined, that location can be compared to the geographic location specified in the event criteria. When there is a match between the location of the user device and the location specified in the event criteria, the content is still eligible for distribution in response to the opportunity. When a match does not exist, the content may be identified as ineligible for distribution. Note that the geographic information specified in the event criteria can include any geographic location corresponding to users that were deemed interested in the event, and may not be limited to the geographic location at which the live event will occur.

A determination is made that the user is interested in the live event (414). In some implementations, the determination is made based on user attributes associated with the opportunity to provide content and the event criteria. For example, a user profile of the user to which the content will be provided can be compared to a set of user attributes specified in the event criteria. The user attributes can include, for example, user interests, user groups to which the user belongs, and/or demographic information supplied by the user. When a match is determined to exist, the content remains eligible for distribution in response to the identified opportunity. When a match does not exist, the content may be identified as ineligible for distribution in response to the opportunity.

In some implementations, the determination that the user is interested in the live event is made independent of an online resource that the user is viewing or has requested. For example, as discussed above, a user may request a web page related to dogs, which is not related to an upcoming concert. However, when the user attributes for the user match the event criteria and the opportunity is within the interest period for the live event, the content distributed based on the concert may be shown to the user with the web page related to dogs. As such, the event-based content distribution can extend the reach (e.g., increase an audience size) for content beyond keyword based content distribution. In particular, the event-based content distribution enables content related to a given event to be shown with a given online resource even when that online resource is related to a different topic or interest than the given event.

Computer executable instructions that initiate presentation of the content on a display of the user device are provided (416). In some implementations, the instructions are provide in response to determining that the time of the opportunity is between the start time and the end time, that the user device is located in the same geographic region as the live event, and that the user is interested in the live event.

In some implementations, the instructions are provided when the content is selected (e.g., by a content selection process) for distribution from among a set of eligible content. For example, an auction can be used to select the content when multiple portions of content are eligible to be delivered. When an auction is used, the bid used for the content can be selected from the default bid or the peak bid. As discussed above, the peak bid can be used when the opportunity is within a peak interest period for the event, and the default bid can be used at times during the interest period when the peak bid is not used.

Figure 5:
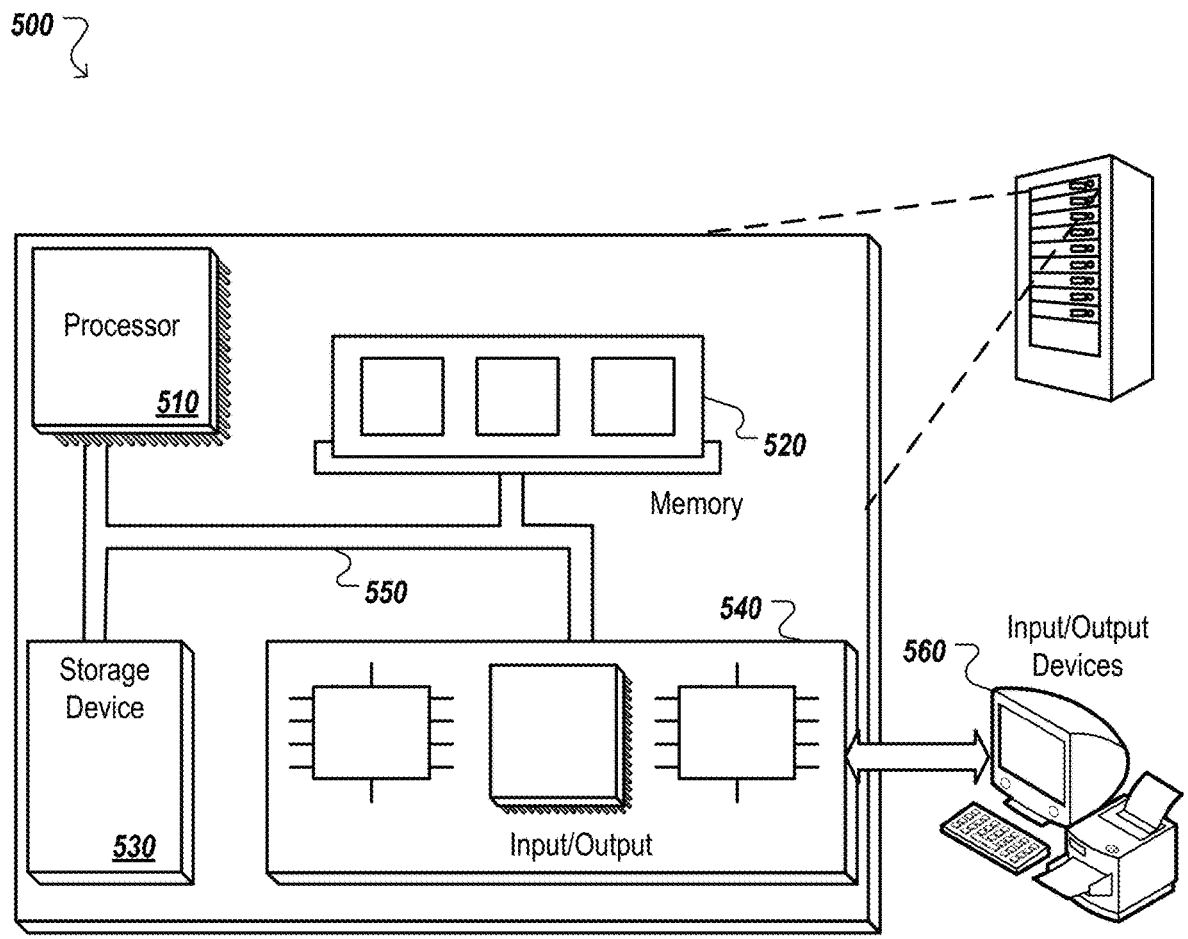
FIG. 5 is block diagram of an example computer system.

FIG. 5 is block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:
    receiving, from a content provider, data identifying a live event associated with particular content provided by the content provider, wherein the data at least specifies a network location for obtaining a current state of the live event;
    in response to receiving the data identifying the live event from the content provider,
        identifying one or more user attributes of a set of users identified as being interested in the live event, and
        assigning, to the particular content provided by the content provider, a combination of distribution criteria that includes the one or more user attributes, wherein assignment of the combination of distribution criteria to the particular content conditions eligibility of the particular content for distribution to users based on the combination of distribution criteria that includes the one or more user attributes being matched by attributes of the users;
    monitoring the current state of the live event at the network location specified in the data that identifies the live event;
    updating, based on the current state of the live event, the combination of distribution criteria assigned to the particular content;
    identifying an opportunity to provide content;
    determining that a particular user is interested in the live event based at least on determining that attributes of the particular user match the updated combination of distribution criteria assigned to the particular content; and
    in response to determining the particular user is interested in the live event, providing, to a user device, data that effects presentation of the particular content by the user device.

2. The method of claim 1, wherein the set of users identified as being interested in the live event comprises users that have expressed interest in the live event.

3. The method of claim 1, wherein identifying one or more user attributes of the set of users identified as being interested in the live event comprises:
    obtaining user profile data that specifies user attributes of the set of users that have been identified as interested in the live event; and
    identifying the one or more user attributes based on the user profile data.

4. The method of claim 3, wherein the user attributes specified in the user profile data comprises one or more of:
    interests of the set of users in events other than the live event;
    demographic information of the set of users; or
    geographic regions in which the set of users are located.

5. The method of claim 1, wherein identifying the opportunity to provide content to the particular user at the user device of the particular user comprises:
    determining an interest period for the live event based on changes in query volume for search queries referencing the live event, wherein the interest period includes an interest start time and an interest end time; and determining that a time of the opportunity is between the interest start time and the interest end time for the live event.

6. The method of claim 1, wherein identifying the opportunity to provide content to the particular user at the user device of the particular user comprises:

determining whether the user device is located in a same geographic region as the live event based on geographical data provided by the user device.

7. The method of claim 1, wherein identifying the opportunity to provide the content to the particular user comprises determining that the particular user has requested access to a resource not related to the live event.

8. The method of claim 1, further comprising:

identifying a future event having characteristics matching distribution criteria associated with content provided by the content provider; and providing, based on the identification, computer executable instructions that initiate presentation of the future event as a live event for the content provider to select as the live event to use for purposes of distributing content provided by the content provider.

9. The method of claim 1, wherein determining the combination of distribution criteria comprises determining a geographic location of users that have been identified as interested in the live event.

10. The method of claim 1, further comprising determining that a time of opportunity for presenting the particular content is during a peak interest period for the live event by determining that the time of the opportunity is during a period during which user online activity related to the live event has increased to a particular level.

11. The method of claim 1, further comprising:

identifying occurrence of the live event at a particular location at a first time; and identifying occurrence of the live event at a different location at a second different time that is after the first time, wherein providing, to the user device, the data that effects presentation of the particular content by the user device to the user device comprises:

providing the data to user devices at the particular location while the live event is occurring at the particular location; and providing the data to user devices at the different location after the second different time.

12. The method of claim 1, wherein the assignment of the combination of distribution criteria to the particular content conditions eligibility of the particular content for distribution to a particular user based on the combination of distribution criteria being matched by attributes of the particular user.

13. A system comprising:

one or more data processing apparatus that execute instructions that cause the one or more data processing apparatus to perform operations including:

receiving, from a content provider, data identifying a live event associated with particular content provided by the content provider, wherein the data at least specifies a network location for obtaining a current state of the live event;

in response to receiving the data identifying the live event from the content provider, identifying one or more user attributes of a set of users identified as being interested in the live event, and assigning, to the particular content provided by the content provider, a combination of distribution criteria that includes the one or more user attributes, wherein assignment of the combination of distribution criteria to the particular content conditions eligibility of the particular content for distribution to users based on the combination of distribution criteria that includes the one or more user attributes being matched by attributes of the users;

monitoring the current state of the live event at the network location specified in the data that identifies the live event;

updating, based on the current state of the live event, the combination of distribution criteria assigned to the particular content;

identifying an opportunity to provide content;

determining that a particular user is interested in the live event based at least on determining that attributes of the particular user match the updated combination of distribution criteria assigned to the particular content; and in response to determining the particular user is interested in the live event, providing, to a user device, data that effects presentation of the particular content by the user device.

14. The system of claim 13, wherein the set of users identified as being interested in the live event comprises users that have expressed interest in the live event.

15. The system of claim 13, wherein identifying one or more user attributes of the set of users identified as being interested in the live event comprises:

obtaining user profile data that specifies user attributes of the set of users that have been identified as interested in the live event; and identifying the one or more user attributes based on the user profile data.

16. The system of claim 15, wherein the user attributes specified in the user profile data comprises one or more of:

interests of the set of users in events other than the live event;

demographic information of the set of users; or geographic regions in which the set of users are located.

17. The system of claim 13, wherein identifying the opportunity to provide content to the particular user at the user device of the particular user comprises:

determining an interest period for the live event based on changes in query volume for search queries referencing the live event, wherein the interest period includes an interest start time and an interest end time; and determining that a time of the opportunity is between the interest start time and the interest end time for the live event.

18. A non-transitory computer storage medium encoded with a computer program, the computer program comprising instructions that when executed by one or more data processing apparatus cause the one or more data processing apparatus to perform operations comprising:

receiving, from a content provider, data identifying a live event associated with particular content provided by the content provider, wherein the data at least specifies a network location for obtaining a current state of the live event;

in response to receiving the data identifying the live event from the content provider, identifying one or more user attributes of a set of users identified as being interested in the live event, and assigning, to the particular content provided by the content provider, a combination of distribution criteria that includes the one or more user attributes, wherein assignment of the combination of distribution criteria to the particular content conditions eligibility of the particular content for distribution to users based on the combination of distribution criteria that includes the one or more user attributes being matched by attributes of the users;

monitoring the current state of the live event at the network location specified in the data that identifies the live event;

updating, based on the current state of the live event, the combination of distribution criteria assigned to the particular content;

identifying an opportunity to provide content;

determining that a particular user is interested in the live event based at least on determining that attributes of the particular user match the updated combination of distribution criteria assigned to the particular content; and in response to determining the particular user is interested in the live event, providing, to a user device, data that effects presentation of the particular content by the user device.

19. The non-transitory computer storage medium of claim 18, wherein the set of users identified as being interested in the live event comprises users that have expressed interest in the live event.

* * * * *